United States Patent
Zeng et al.

(10) Patent No.: US 7,366,238 B2
(45) Date of Patent: Apr. 29, 2008

(54) NOISE FILTER FOR VIDEO PROCESSING

(75) Inventors: Weimin Zeng, San Jose, CA (US); Li Sha, San Jose, CA (US); Ping Zhu, San Jose, CA (US)

(73) Assignee: Micronas USA, Inc., Santa Clara, CA (US)

( * ) Notice: Subject to any disclaimer, the term of this patent is extended or adjusted under 35 U.S.C. 154(b) by 552 days.

(21) Appl. No.: 10/959,333

(22) Filed: Oct. 5, 2004

(65) Prior Publication Data

US 2005/0249293 A1    Nov. 10, 2005

Related U.S. Application Data

(60) Provisional application No. 60/568,892, filed on May 7, 2004.

(51) Int. Cl.
*H04N 7/12* (2006.01)
*G06K 9/40* (2006.01)

(52) U.S. Cl. .................. 375/240.18; 348/666; 382/260

(58) Field of Classification Search ................ 348/241, 348/470, 607, 701, 224.1, 666; 375/240.24; 382/260, 263, 264
See application file for complete search history.

(56) References Cited

U.S. PATENT DOCUMENTS

| | | | | |
|---|---|---|---|---|
| 5,294,974 A | * | 3/1994 | Naimpally et al. | 348/395.1 |
| 5,590,064 A | * | 12/1996 | Astle | 708/203 |
| 5,880,767 A | * | 3/1999 | Liu | 347/251 |
| 6,188,799 B1 | * | 2/2001 | Tan et al. | 382/260 |

* cited by examiner

*Primary Examiner*—Gims Philippe
*Assistant Examiner*—Erick Rekstad
(74) *Attorney, Agent, or Firm*—Mayer Brown LLP

(57) ABSTRACT

A noise filter for a video processing system includes a block selector, a cost calculator, a cost table, a cost comparator, and a coefficient filter. The block selector is coupled to receive data from the quantization unit and selects blocks for additional filtering. The selected blocks are provided to the cost calculator determines a cost for each of the coefficients in the block using the cost table and the costs are summed. The cost comparator compares the total to a threshold, and filters the coefficients using the coefficient filter if the total is greater a preset threshold. The noise filter to the VLC unit then outputs the filter data.

20 Claims, 6 Drawing Sheets

NOISE FILTER FOR VIDEO PROCESSING

CROSS-REFERENCE TO RELATED APPLICATION

This application claims the benefit of U.S. Provisional Patent Application No. 60/568,892 filed on May 7, 2004, entitled "Video Processing System and Method, which is incorporated herein by reference.

BACKGROUND OF THE INVENTION

1. Field of the Invention

The present invention relates generally to video image processing, and more particularly, to a noise filter for use in video compression of images.

2. Background Art

With the advent of digital television and streaming media, a number of new techniques have been developed over the recent past to allow video images to be processed and compressed. Moreover, a number of standards have been developed such as those developed by the Moving Pictures Experts Group (MPEG) for coding audio-visual information in a digital compressed format. Various new standards such as MPEG-4 or Advanced Video Coding (AVC) H.264 have been recently developed or are being developed and provide additional parameters to define the processing of digital video data. Additionally, there are a number of different transformation types that are being used to process and compress video data.

One problem with existing approaches is that during the video processing noise is often introduced or added to the original signal. FIG. 1 illustrates a conventional approach 100 to coding audio-visual information into a digital compressed format. A raw video signal is input on line 110 to a motion estimation unit 102 that generates the motion vectors that determine how each motion compensated prediction frame is created from the previous frame. Then a discrete cosine transform (DCT) unit 104 converts the signal into elementary frequency components. This separates the image into parts (or spectral sub-bands) of differing importance (with respect to the image's visual quality). Then quantization unit 106 processes the transformed vectors to produce indices representing the original image data on line 112. The quantization unit 106 takes an input vector and outputs the index of the codeword that offers the lowest distortion. In this case, the lowest distortion is found by evaluating the Euclidean distance between the input vector and each codeword in the codebook. Once the closest codeword is found, the index of that codeword is sent through a channel 112. The variable length coding (VLC) unit 108 receives the indices performs variable length coding to further compress the quantized image. The output of the VLC unit 108 is provide on line 114 and provided the compress image data.

As can be seen from FIG. 1, any one of the couplings between the motion estimation unit 102, DCT unit 104, quantization unit 106, VLC unit 108 or input line 110 can be areas where noise can be introduced into the video signal. Noise often occurs when the source video has background noise. This becomes problematic for a number of reasons. First, the addition of noise to the original signals produces effects on the video output that is displayed. For example, added noise may cause or add flicker to the video image. Second, the noise increased the computational resources required to process the image by introducing additional coefficients requiring additional bits during the encoding process.

Accordingly, there is a need for an improved video processing system that includes a noise filter to reduce the effects of background noise. More particularly there is a need for a noise filter that can modify the video signal between quantization and variable length coding such as under H.264.

SUMMARY OF THE INVENTION

The above needs are met by a system and method for filtering noise during the processing of video data. The noise filter of the present invention is preferably coupled between the quantization unit and the VLC unit. The noise filter preferably comprises a block selector, a cost calculator, a cost table, a cost comparator, and a coefficient filter. The block selector is coupled to receive data from the quantization unit and selects blocks for additional filtering. The selected blocks are provided to the cost calculator determines a cost for each of the coefficients in the block using the cost table and the costs are summed. The cost comparator compares the total to a threshold, and filters the coefficients using the coefficient filter if the total is less than a preset threshold. The noise filter to the VLC unit then outputs the filter data. The present invention includes a method for filtering a video signal. The method preferably comprises the steps of: selecting blocks with small coefficients, determining a total cost for the coefficients in the block, comparing to the total to a threshold and filtering the coefficients by setting them to zero if the total is less than a preset threshold.

DETAILED DESCRIPTION OF THE INVENTION

Figure 1:
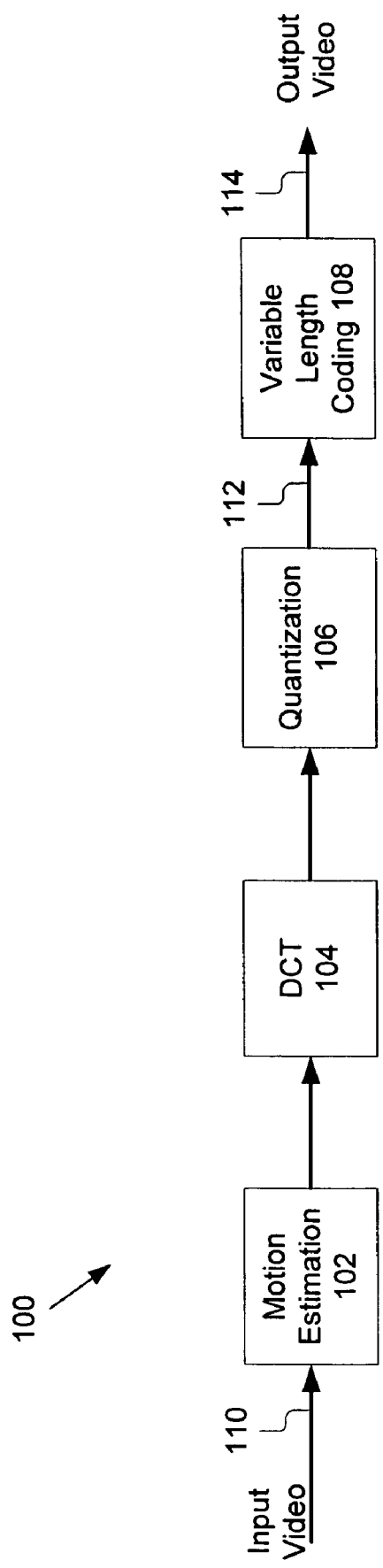
FIG. 1 is a block diagram of a video processing system according to the prior art.
Figure 2:
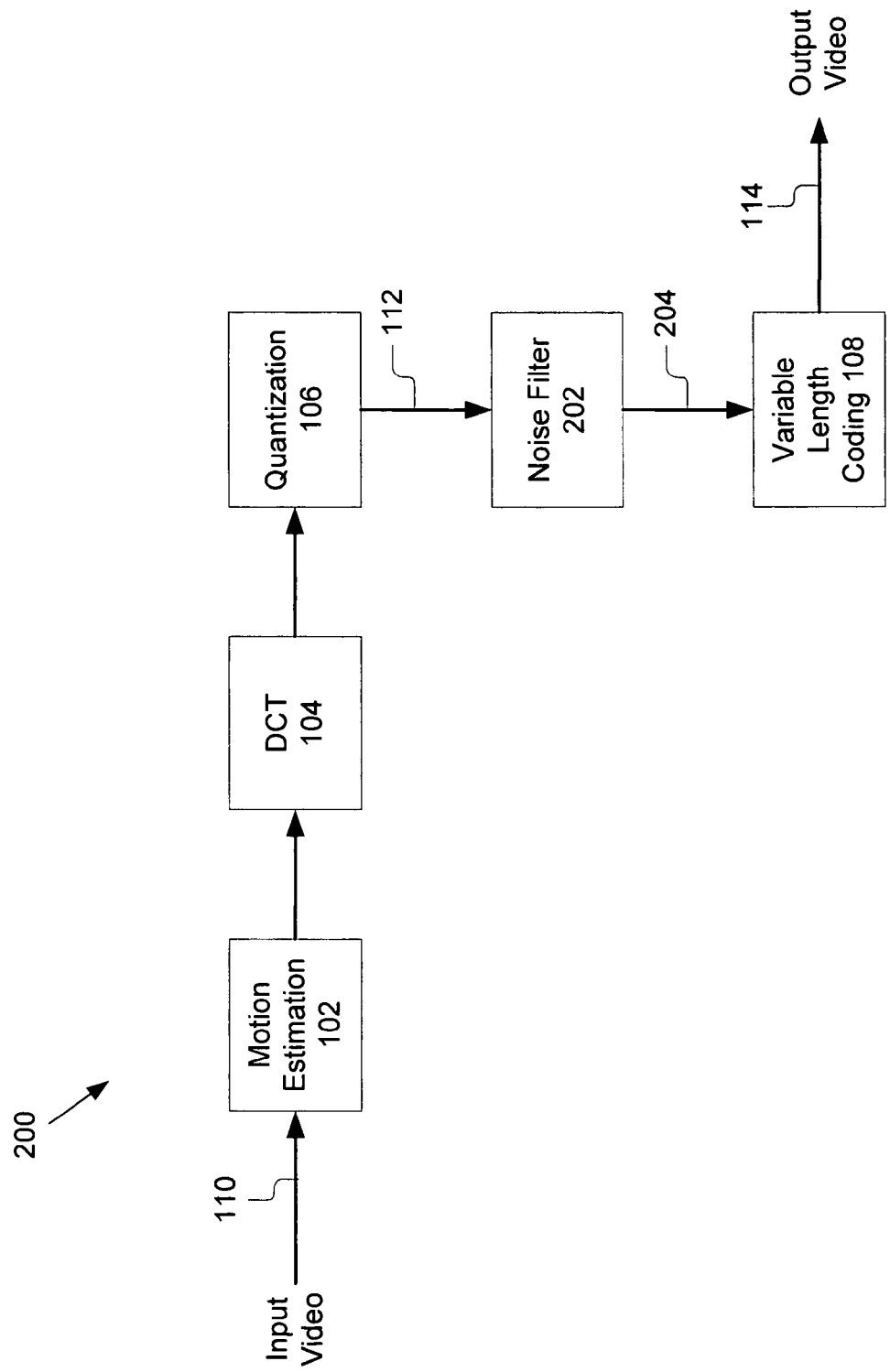
FIG. 2 is a block diagram of a video processing system including a noise filter according to an embodiment of the present invention.

Referring now to FIG. 2, an embodiment of the present invention in a video processing system 200 is shown. For convenience and ease of understanding like reference numbers are used to represent like components as compared with the prior art has been described above with reference to FIG. 1. As shown in FIG. 2, a system 200 according to the present invention preferably comprises a motion estimation unit 102, a DCT unit 104, a quantization unit 106, a noise filter 202 and a VLC unit 108. The motion estimation unit 102 is coupled to input line 110 to receive raw video data. The motion estimation unit 102, DCT unit 104, and quantization unit 106 are coupled in series and perform conventional functions as will be understood by those skilled in the art. In particular, the DCT unit covert the spatial image pixel values into transform coefficients. The quantization unit 106 takes those coefficients and coarsely quantizes the less significant coefficients. The quantization unit 106 has an output coupled to signal line 112. The input of the noise filter is coupled to signal line 112. The noise filter 202 advantageously filters and removes small values after quantization. The noise filter checks the quantized matrix and determines whether all the coefficients are in a predefined range. If within the range and a coefficient cost is below a threshold, the signal is filtered before it is output by noise filter 202 on signal line 204. The input of the VLC unit 108 is coupled to signal line 204 and receives the filtered signal. The VLC unit 108 performs a variable length coding in a conventional manner before outputting the compressed video data on signal line 114.

Figure 3:
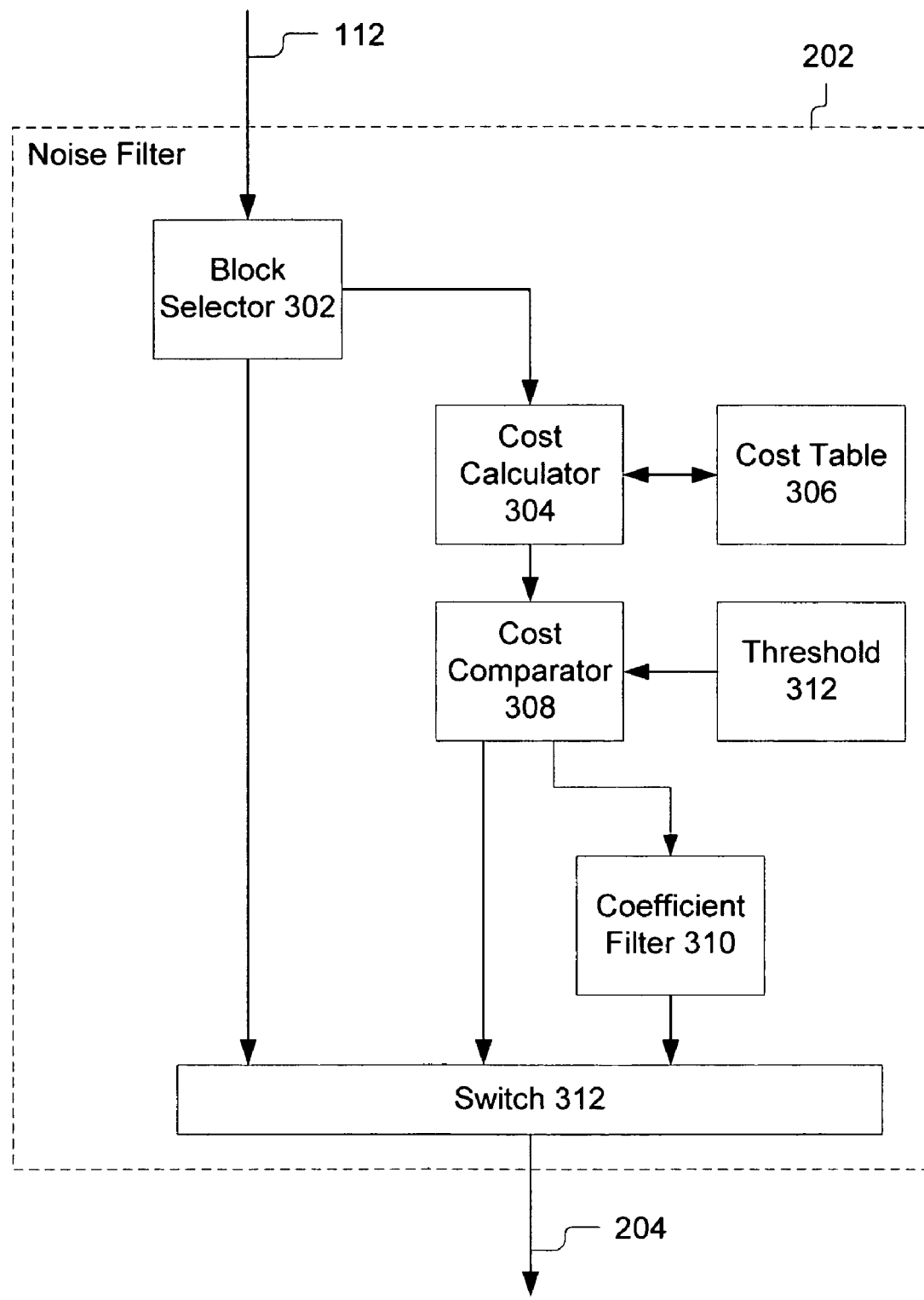
FIG. 3 is a block diagram of the noise filter according to one embodiment of the present invention.

Referring now to FIG. 3, the noise filter 202 of the present invention is shown in more detail. The noise filter 202 preferably comprises a block selector 302, a cost calculator 304, a cost table 306, a cost comparator 308, a coefficient filter 310, and a switch 312.

The present invention filters the signal on a block-by-block basis. The blocks are preferably 8 by 8 DCT pixel blocks. The block selector 302 is coupled to line 112 to receive data from the quantization unit 106 and selects blocks for additional filtering. The present invention advantageously has filtering criteria on multiple levels. First, the blocks are selected for filtering by the block selector 302 and whether the filter is applied to the block is determined, as will be described below, by and in reference to the cost comparator 308. In an exemplary embodiment, the block selector 302 selects blocks for filtering only where all the coefficients in the block are in the range of −1 to 1. In other words, if there is even a single coefficient in the block that is outside the range of −1 to 1, the block is not filtered and the coefficients are sent from the block selector 302 to the switch 312 for output on line 204 unfiltered. Noise typically results in small values for the coefficients after quantization. Therefore, this method for selecting blocks is effective at removing noise after quantization. Those skilled in the art will recognize that the block selector 302 may use of a variety of other criteria to determine which blocks are filtered, and this range is just one example of a method that may be used.

The blocks that meet this first criterion for filtering are passed on to the cost calculator 304. The cost calculator 304 determines and sums a cost value for all the coefficients in the block. The cost calculator 304 is coupled to an output of the block selector 302, the cost table 306 and the cost comparator 308. The cost is determined by looking it up in the cost table 306 for the coefficient. The cost calculator 304 determines a cost for each non-zero coefficient value in the block. In an exemplary embodiment, the cost is related to the variable length coding, and is a value that is a function of the run length (number of successive zeros) following the zigzag scan order when coding pixels. Those skilled in the art will recognize that various other methods may be used to calculate cost values so long as they are the related to the cost of variable length coding, and this is just one example of a method that may be used. In the preferred embodiment, such costs are calculated for the coefficients and stored in the cost table 306. The cost for each non-zero coefficient value in the block are determined and then summed by the cost calculator 304. This value along with the coefficients for the block is then sent the cost comparator 308.

The cost comparator 308 compares the total costs for the block to a threshold. The cost comparator 308 is coupled to a register 312 storing a threshold value, the cost calculator 304, the switch 312, and the coefficient filter 310. The cost comparator 308 compares the total costs for the block as received from the cost calculator 304 to the threshold value stored in the register 312. If the total costs for the block are greater that the threshold, the coefficients are output by the cost comparator 308 unchanged and unfiltered. If the costs are greater than the threshold, the cost run is large and thus it is not likely that the coefficients represent noise, therefore they are not filtered. This effectively means that the filter does not filter out where there are many DCT low frequency components. By setting the threshold as desired, the user effectively has the ability or option not to filter. The threshold value is preferably set using testing on an exemplary video sample as will be understood by those skilled in the art.

If the total costs for the block are not greater that the threshold, then the block is sent to the coefficient filter 310 where the block is filtered before being output to the switch 312. The coefficient filter 310 has an input coupled to the cost comparator for receiving the coefficients for the block and an output for providing the filtered block. In an embodiment, the coefficient filter 310 filters the signal by setting all the coefficients in the block to zero values (zero out the entire quantization matrix). Those skilled in the art will realize that there may be other methods to filter the coefficients, such as by zeroing some or select ones of the coefficients to zero, all of which are included in the present invention. If the total cost for the block is lower than the threshold, it is likely that the coefficients represent noise, and by making all the coefficients zero, you eliminate extra coefficients that require significant addition bits to code because they are not expected by a normal VLC. In other words, by eliminating the extra coefficients the coding efficiency for the VLC unit 108 is improved. The present invention is particularly advantageous because it reduces the bit rate without impacting the compressed video quality of the image.

Figure 4:
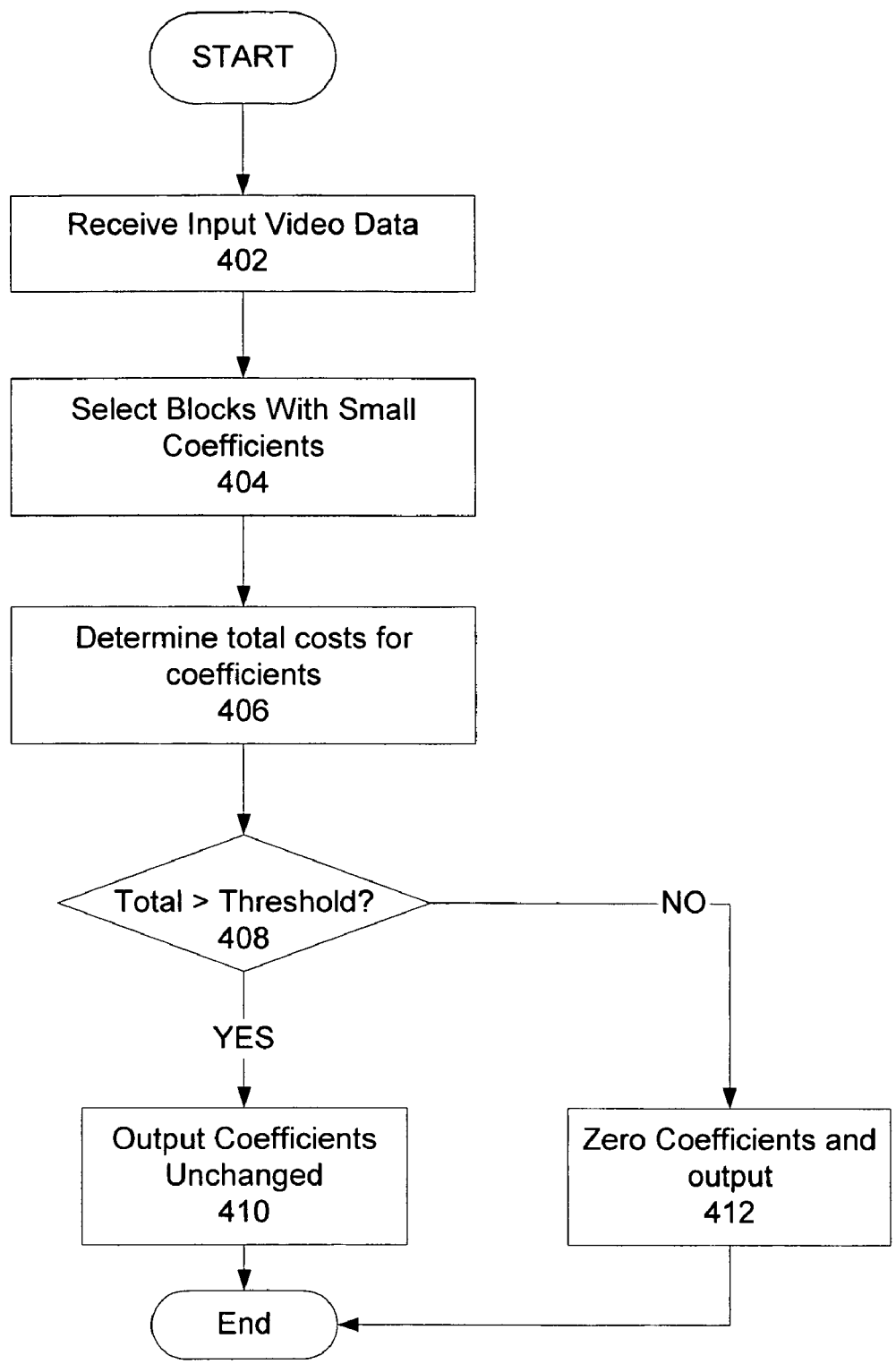
FIG. 4 is a flowchart of a first embodiment of a method for filtering noise according to the present invention.

Referring now to FIG. 4, a first embodiment of the method for filtering according to the present invention will be described. The method begins in step 402 by receiving input video data. Then in step 404, blocks of data with small coefficients are selected. As noted above for the block selector 302, the method preferably selects blocks in which all the coefficients are in the range of 1 to −1 are selected. Next in step 406, the total costs for the coefficients in the selected block are determined. This total cost is then compared 408 to a threshold. If the total cost is greater that the threshold, the coefficients are output by the filter unchanged, however if the total cost is less than or equal to the threshold, all the coefficients for the block are set to zero and the output.

Figure 5A:
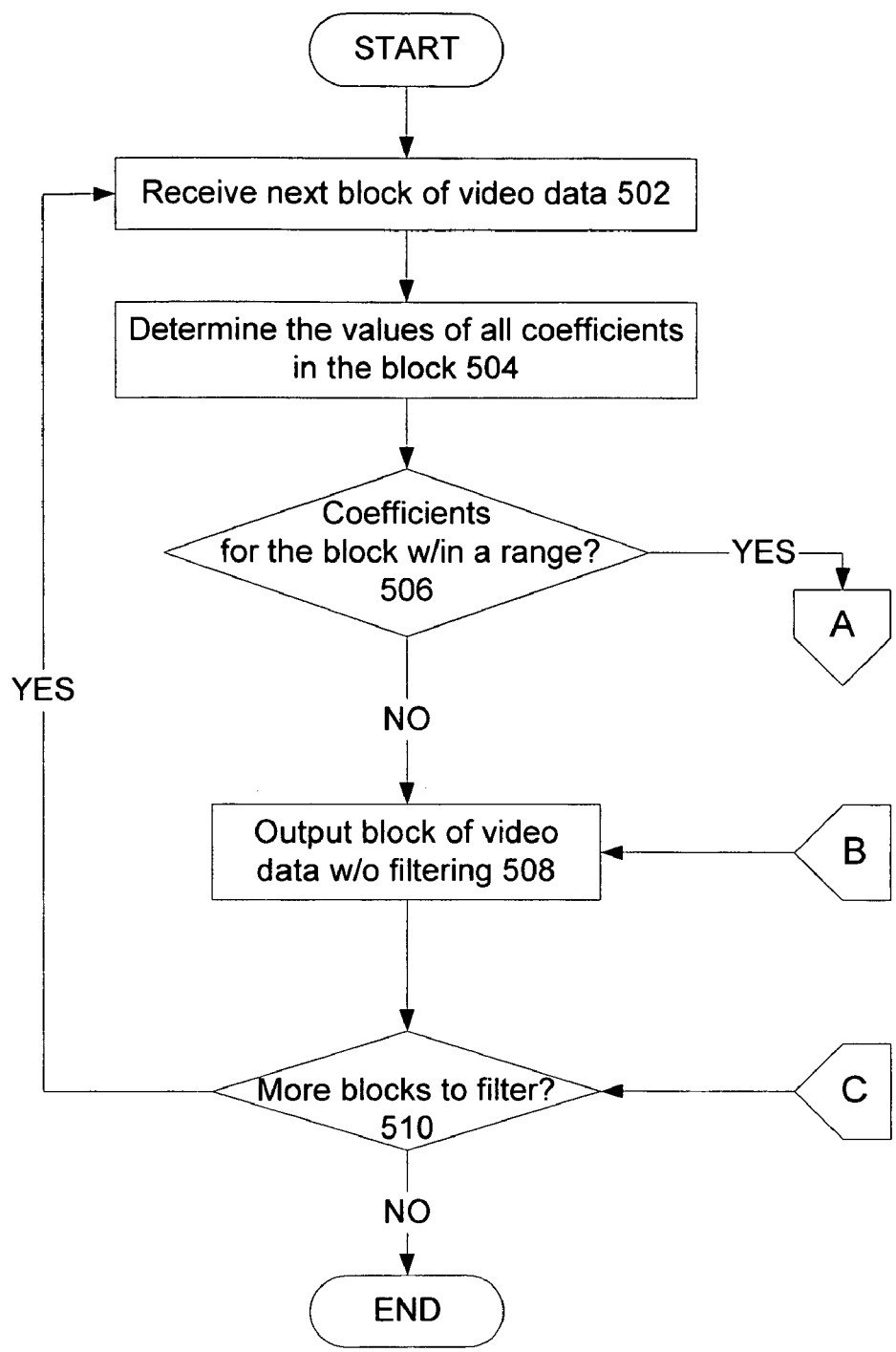
FIGS. 5A and 5B are a flowchart of second embodiment of the method for filtering noise according to the present invention.
Figure 5B:
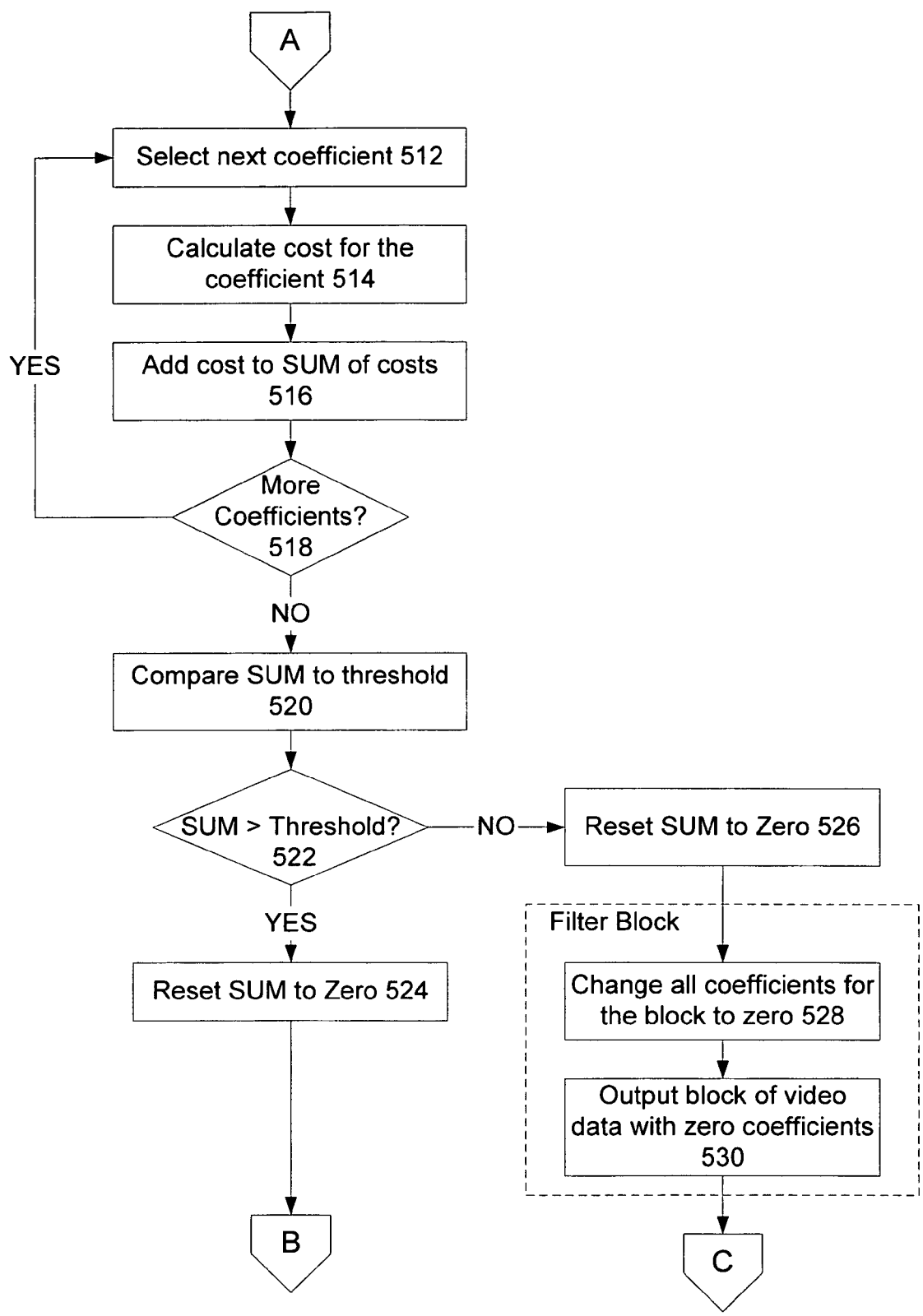

Referring now to FIGS. 5A and 5B, a second embodiment for filtering according to the present invention will be described. As shown in FIG. 5A, the process begins in step 502 when the filter 202 receives a first or next block of video data from the quantization unit 106. Then the values for all the coefficients in the block are determined 504. Then the method determines 506 whether all the coefficients for the block are within a predetermined range. For example, do all the coefficients for the block have values between 1 and −1? If not, the method outputs 508 the block without additional filtering, and the method continues in step 510 to determine if there are additional blocks to process. If there are additional blocks of video data to process the method returns to step 502 to begin processing them. If not the method is complete and ends.

As shown in FIG. 5B, if at step 506, the method determines that all the coefficients for the block are within a predetermined range, the block is eligible for filtering and the method continues in step 512. The method selects a non-zero coefficient for the block and calculates the cost for the coefficient. The cost is calculated by accessing a look up table for a value associated with the coefficient. The cost is added to sum of costs, and then the method determines whether there are more coefficients 518 for which to calculate their costs. If so the method returns to step 512, and performs step 512, 514, 516 and 518 for non-zero coefficients. If there are no more non-zero coefficients, then the sum of costs, SUM, is compared 520 to a preset threshold. If the sum is greater than the threshold, the SUM is reset 524 to zero, and the method continues in step 508 of FIG. 5A where the block of video data is output without filtering. If the sum is not greater than the threshold, the method resets 526 the SUM to zero, and the filters the block. More particularly, the method changes 528 all the coefficients for the block to zero, and then output 530 the block of video data with the changed coefficients. After step 530, the method returns to step 510 of FIG. 5A to determine if there are additional blocks to filter.

The above description is included to illustrate the operation of the preferred embodiments and is not meant to limit the scope of the invention. The scope of the invention is to be limited by only the following claims. From the above discussion, many variations will be apparent to one skilled in the relevant art that would yet to be encompassed by the spirit and scope of the invention.

What is claimed is:

1. A method for filtering noise from a video signal, the method comprising the steps of:
   receiving a plurality of blocks of video data;
   selecting a block for filtering by determining a value for a coefficient in the block and determining whether the value of the coefficient is within a range of 1 to −1 and selecting the block if the coefficient is within the range;
   determining a total cost for the selected block;
   determining whether the total cost is greater than a predefined threshold; and filtering the selected block if the total cost is not greater than the predefined threshold.

2. The method of claim 1 wherein the step of selecting comprises selecting the block if coefficients for the block are small.

3. The method of claim 1 wherein the step of determining the value for the coefficient in the block determines the values of a plurality of coefficients in the block and wherein the block is selected if all the values are within the range.

4. The method of claim 1 wherein the step of determining the total cost for the selected block further comprises the steps of:
   calculating a cost for a first coefficient in the block;
   calculating a cost for a second coefficient in the block;
   summing the cost for the first coefficient with the cost for the second coefficient for a total cost.

5. The method of claim 1 wherein the cost is related to a cost for variable length coding the coefficient.

6. The method of claim 1 wherein the cost is a value that is a function of the run length (number of successive zeros) between coefficients.

7. The method of claim 4 wherein the step of calculating the cost comprises retrieving from a table a value associated with a coefficient.

8. The method of claim 1 wherein the step of filtering the selected block comprises changing at least one non-zero coefficient to zero.

9. The method of claim 1 wherein the step of filtering the selected block comprises changing a plurality of non-zero coefficients to zero.

10. The method of claim 1 wherein the step of filtering the selected block comprises changing all non-zero coefficients to zero.

11. An apparatus for filtering video data comprising:
    a block selector for selecting blocks for filtering, the block selector having an input and an output, the input of the block selector coupled to receive video data, wherein the block selector selects blocks for filtering if the block has coefficients that are in a range of 1 to −1;
    a cost calculator having an input and an output for determining a total cost for a block of video data, the cost calculator having an input coupled to the output of the block selector; and
    a coefficient filter having an input and an output, for filtering the video data signal, the input of the coefficient filter coupled to the output of the cost calculator, and the output of the coefficient filter providing filtered video data.

12. The apparatus of claim 11 wherein the block selector selects blocks for filtering that if the block has small coefficients.

13. The apparatus of claim 11, wherein the cost calculator includes a cost table having a plurality of coefficient values and associated cost values, the cost table coupled to the cost calculator.

14. The apparatus of claim 11 wherein the cost calculator generates a cost value that is related to the cost of variable length coding the coefficient.

15. The apparatus of claim 11 wherein the cost calculator generates a cost value that is a function of the run length (number of successive zeros) between coefficients.

16. The apparatus of claim 11 further comprising a cost comparator having a first input, a second input and an output, the cost comparator for comparing a cost value to a predefined threshold and filtering if the cost value is less than the threshold, the first input of the cost comparator coupled to the output of the cost calculator, the second input of the cost comparator coupled to receive the threshold value and the output of the cost comparator coupled to the input of the coefficient filter.

17. The apparatus of claim 11 wherein the coefficient filter filters the video data by changing a least one coefficient value to zero.

18. The apparatus of claim 11 wherein the coefficient filter filters the video data by changing a plurality of coefficient values to zero.

19. The apparatus of claim 11 wherein the coefficient filter filters the video data by changing all the non-zero coefficient values to zero.

20. An apparatus for filtering video data comprising:
    a block selector for selecting blocks for filtering, the block selector having an input and an output, the input of the block selector coupled to receive video data;
    a cost calculator having an input and an output for determining a total cost for a block of video data, the cost calculator having an input coupled to the output of the block selector;
    a coefficient filter having an input and an output, for filtering the video data signal, the input of the coefficient filter coupled to the output of the cost calculator, and the output of the coefficient filter providing filtered video data; and
    a switch having a plurality of inputs and an output for selecting an output from the plurality of inputs, a first input of the switch coupled to the output of the block selector, a second input of the switch coupled to the output of the cost calculator and third input of the switch coupled to the output of the coefficient filter.

* * * * *